No. 830,100. PATENTED SEPT. 4, 1906.
J. POST.
ANTIFRICTION BEARING.
APPLICATION FILED JAN. 12, 1906.
3 SHEETS—SHEET 2.
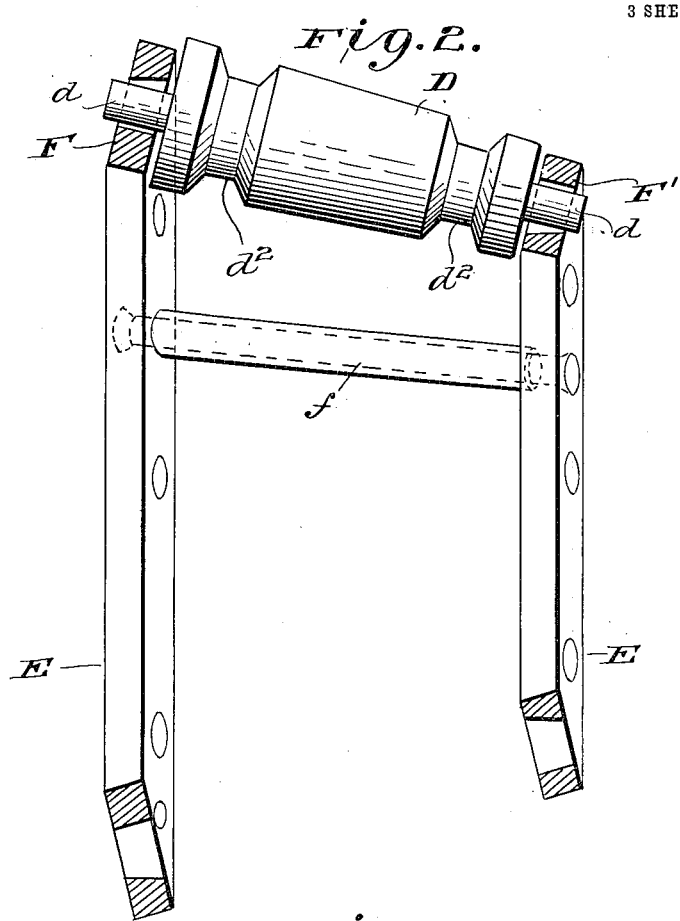
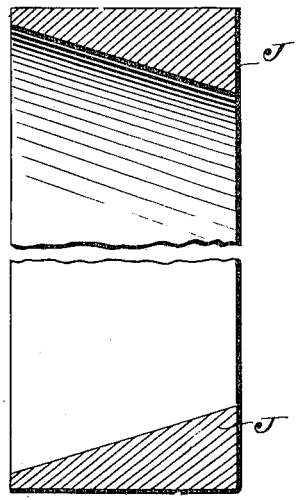

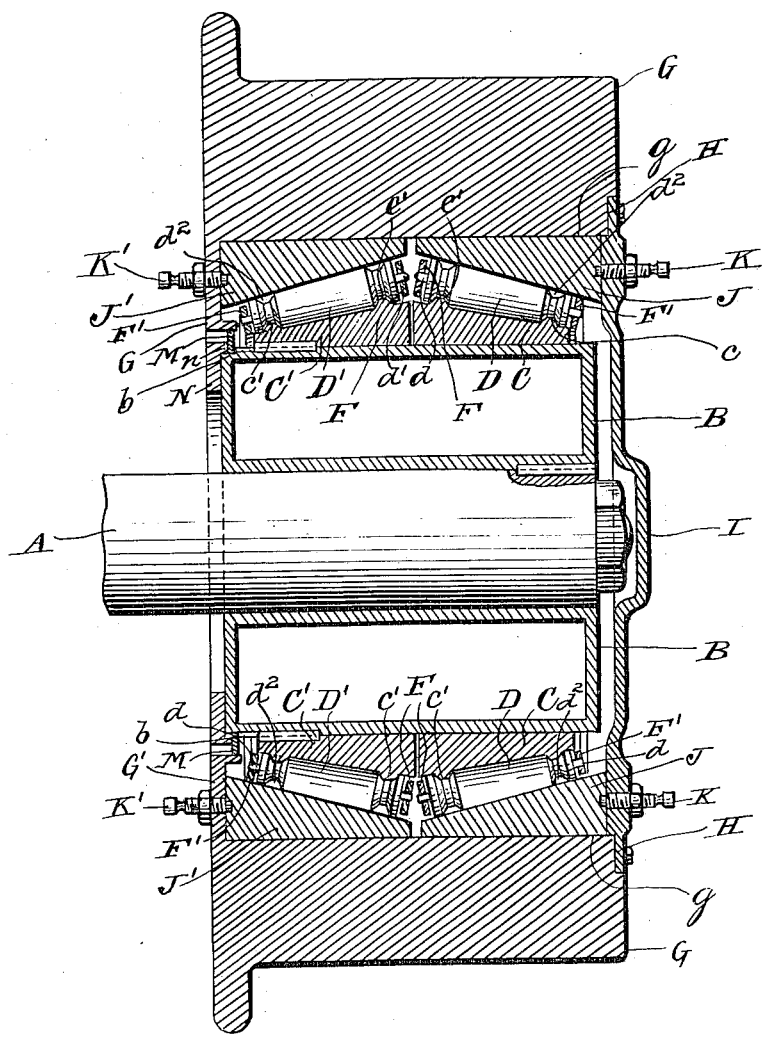

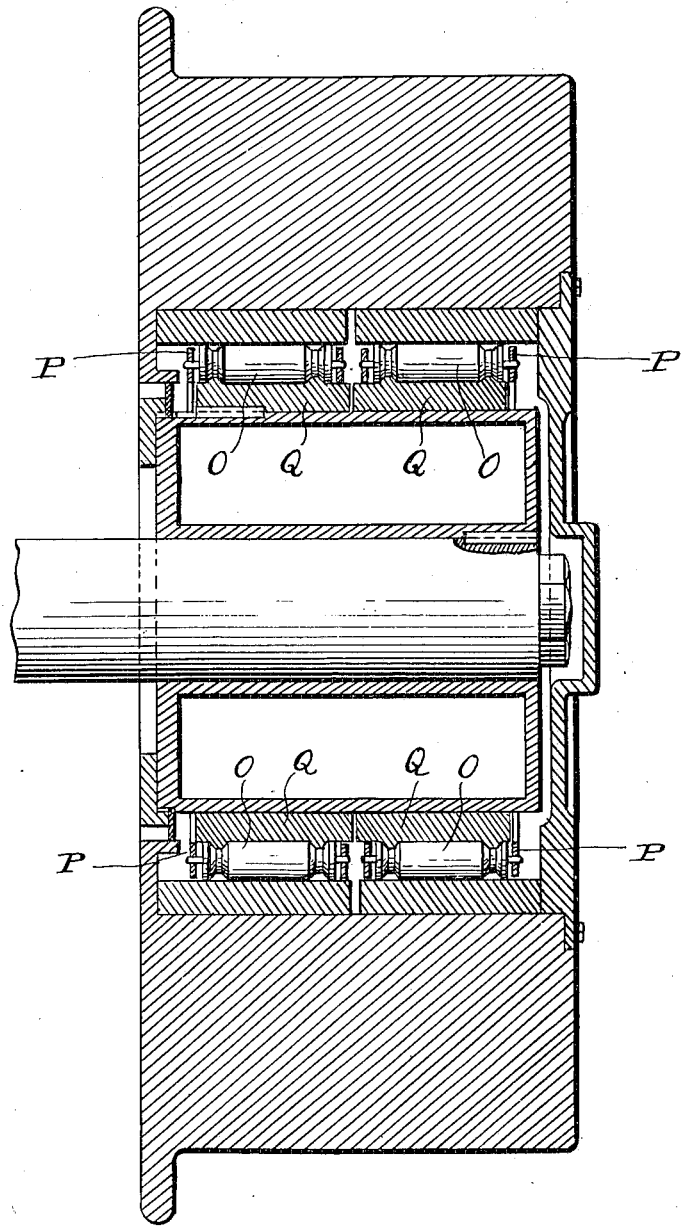

UNITED STATES PATENT OFFICE.

JOHN POST, OF PHILADELPHIA, PENNSYLVANIA, ASSIGNOR TO GENERAL TRACTION COMPANY, OF WASHINGTON, DISTRICT OF COLUMBIA, A CORPORATION OF THE DISTRICT OF COLUMBIA.

ANTIFRICTION-BEARING.

No. 830,100.      Specification of Letters Patent.      Patented Sept. 4, 1906.

Application filed January 12, 1906. Serial No. 295,760.

*To all whom it may concern:*

Be it known that I, JOHN POST, a citizen of the United States, and a resident of Philadelphia, in the county of Philadelphia and State of Pennsylvania, have invented certain new and useful Improvements in Antifriction-Bearings, of which the following is a specification.

My invention relates to frictionless bearings for car and vehicle wheels, and has for its object the provision of improved bearings in which the wheel rotates upon rollers arranged in gangs by being rotatably mounted in circular frames consisting of two rings secured to and spaced apart by cross-rods, said rollers traveling on suitable raceways secured to the wheel-hub and the vehicle-axle.

In the preferred form of my invention the rollers are conical-shaped and arranged in two gangs in the wheel, with the larger ends journaled in larger rings than their smaller ends and adjacent to one another, the rollers being grooved and running on beaded raceway-rings secured to the wheel-hub and with rings angular in cross-section mounted between the rollers and the wheel-rim, with set-screws secured to the wheel-casing and their ends being inserted in depressions in the said rings to adjust them to counteract the wear on the rollers. By this construction friction incident to the rotation of the wheel is practically eliminated, and at the same time lateral motion of the wheel is obviated.

The construction of my invention will be described in detail hereinafter, and illustrated in the accompanying drawings, in which—

Figure 1 is a cross-section of my improved antifriction-wheel; Fig. 2, a detail view of a fragment of one of the circular frames, showing the rollers mounted therein; Fig. 3, an enlarged view in cross-section of one of the raceway-rings, and Fig. 4 a cross-section showing a modification of my improved bearing.

In the drawings similar reference characters indicate corresponding parts throughout the several views.

A indicates one end of a car-axle, to which is keyed a hub B.

C C' indicate raceway-rings secured to hub B, having inclined surfaces higher at the center of the hub than toward its ends and with raceway-tracks $c$ $c'$ thereon.

The antifriction-rollers D D' are conical-shaped and are rotatably mounted in circular frames E E' by means of spindles or trunnions $d$ on each end of the rollers, said frames consisting of two rings F and F', connected together at intervals and spaced apart by cross-rods $f$. The larger ends of rollers D D' are mounted in rings F, which are greater in diameter than rings F', in which the smaller ends of the rollers are mounted, and when in position the larger ends of the rollers are on the higher portions of the raceway-rings C C', the rollers D D' being grooved, as shown at $d^2$ $d^2$, to receive the raceway-tracks $c$ $c'$.

G indicates the wheel-rim, which is formed with an annular recess $g$ to receive the axle, hub, and antifriction-rollers described above and provided with a circular depression H on its outer surface to receive a plate I to cover said recess $g$ and the outer ends of the axle A and hub B.

J J' indicate rings mounted between the surface of recess $g$ and rollers D D', which are angular in cross-section, and K K' indicate set-screws secured in threaded bores L in the flange G' of wheel-rim G and in plate I on the outer side of the wheel to tighten the bearings to counteract the wear on the rollers D D' the raceway-rings C C', and rings J J'.

On the inner side of the hub B is formed an annular depression $b$, in which is seated a packing-ring M of any suitable material and which bears against the edge of flange G' to make the joint oil-tight, it being contemplated to fill the recess $g$ with a lubricant to lubricate the bearings above described.

N indicates a compression-ring secured to the inner end of the hub B and having a flange $n$ to bear against packing-ring M to hold it in position. By this construction it will be readily understood that the lateral motion of the wheel will be entirely obviated, and the life of the bearing will be prolonged because of the construction above described that admits of tightening the bearings to counteract wear and use. In Fig. 4, however, is shown a construction employing cylindrical rollers O, journaled in rings P of the same diameter and traveling on flat raceway-rings Q, though the angularly-mounted bearings shown in Fig. 1 is the preferred form of my invention.

Having thus described my invention, what I claim is—

1. An antifriction-bearing comprising the combination of a wheel having a recess therein, bearings mounted in said recess, rings interposed between said bearings and the surface of the recess, and means operated exteriorly of the wheel to adjust said rings, substantially as shown and described.

2. In an antifriction-bearing for wheels, an axle, a hub secured to said axle, raceway-rings secured to said hub having inclined surfaces, rollers mounted to travel on said raceway-rings, the wheel formed with a recess to receive said hub, raceway-rings, and rollers, rings mounted between the surface of said recess and the rollers, and set-screws secured in said wheel and engaging the last-mentioned rings to adjust said rings to tighten the bearings, substantially as shown and described.

3. In an antifriction-bearing for wheels, an axle, a hub secured to said axle having a recess in its inner end, a packing-ring mounted in said recess, a compression-ring secured to the end of said hub and having a flange to engage said packing-ring, two raceway-rings secured to said hub and having inclined surfaces higher toward the middle of the hub than the ends and having circumferential tracks, conical rollers mounted on said raceway-rings and having grooves to travel on said tracks, the ends of said rollers journaled in circular frames, said frames comprising rings and rods secured to said rings to secure simultaneous movement thereof, the wheel formed with a recess to receive said hub, raceway-rings, and rollers, there being a flange on said wheel bearing against said packing-ring, a plate to cover the opening to said recess, rings angular in cross-section mounted between said rollers and the surface of said recess, and set-screws mounted in the wheel and plate and bearing against said angular rings, substantially as shown and described.

In witness whereof I have hereunto set my hand in presence of two subscribing witnesses.

JOHN POST.

In presence of—
H. B. KOFFEL,
WOOD M. ODWOLT.